(12) United States Patent
Knoplioch et al.

(10) Patent No.: US 6,718,193 B2
(45) Date of Patent: Apr. 6, 2004

(54) METHOD AND APPARATUS FOR ANALYZING VESSELS DISPLAYED AS UNFOLDED STRUCTURES

(75) Inventors: Jerome F. Knoplioch, Neuilly sur Seine (FR); Gilles R. R. Moris, Boulogne Billancourt (FR); Fabienne A. Betting, Paris (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 82 days.

(21) Appl. No.: 09/976,121

(22) Filed: Oct. 12, 2001

(65) Prior Publication Data

US 2002/0106116 A1 Aug. 8, 2002

Related U.S. Application Data

(60) Provisional application No. 60/253,542, filed on Nov. 28, 2000.

(51) Int. Cl.$^7$ ................................................. A61B 5/05
(52) U.S. Cl. ...................... 600/407; 382/128; 128/920
(58) Field of Search ............................... 600/407, 109, 600/160, 463, 466, 467, 920; 382/131, 128; 345/685; 434/262, 267, 272; 73/623; 128/920

(56) References Cited

U.S. PATENT DOCUMENTS

| | | | | |
|---|---|---|---|---|
| 5,038,786 A | * | 8/1991 | Kojima ........................ | 600/410 |
| 5,622,174 A | * | 4/1997 | Yamazaki .................... | 600/441 |
| 5,638,819 A | * | 6/1997 | Manwaring et al. ......... | 600/424 |
| 5,891,030 A | * | 4/1999 | Johnson et al. .............. | 600/407 |
| 6,151,404 A | | 11/2000 | Pieper | |
| 6,212,420 B1 | * | 4/2001 | Wang et al. ................. | 600/407 |
| 6,331,116 B1 | * | 12/2001 | Kaufman et al. ............ | 434/262 |
| 6,456,735 B1 | * | 9/2002 | Sato et al. ................... | 382/131 |

\* cited by examiner

Primary Examiner—Dennis W. Ruhl
Assistant Examiner—Barry Pass
(74) Attorney, Agent, or Firm—Quarles & Brady LLP; Carl Horton

(57) ABSTRACT

A method and apparatus for displaying information concerning a tubular structure is disclosed. The method includes determining a centerline of the tubular structure and a plurality of center points along that centerline, determining a plurality of cross-sections at the respective center points that are perpendicular to the centerline, and identifying first values associated with each of the cross-sections and indicative of a first characteristic of the tubular structure. The method additionally includes generating a modified image of the tubular structure by determining a plurality of image lines corresponding to the respective cross-sections, and displaying a curve that represents the first characteristic alongside the modified image. The curve is formed by displaying, along a scale, a plurality of second values that are functionally related to the respective first values, each second value being positioned alongside the modified image along a respective one of the image lines.

21 Claims, 10 Drawing Sheets

METHOD AND APPARATUS FOR ANALYZING VESSELS DISPLAYED AS UNFOLDED STRUCTURES

CROSS REFERENCE TO RELATED APPLICATIONS

This application claims the benefit of U.S. provisional application No. 60/253,542 filed on Nov. 28, 2000 entitled Method and Apparatus For Analyzing Vessels Displayed As Unfolding Structures.

BACKGROUND OF THE INVENTION

This invention relates generally to methods and apparatuses for analysis of vessel images, and more particularly to methods and apparatuses for assisting medical care personnel such as radiologists in preparing measurements and reports for surgical planning from images derived from computed tomographic, MR, and 3D radiation imaging.

In at least some computed tomography (CT) imaging system configurations, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. X-ray sources typically include x-ray tubes, which emit the x-ray beam at a focal spot. X-ray detectors typically include a collimator for collimating x-ray beams received at the detector, a scintillator adjacent the collimator, and photodetectors adjacent the scintillator.

An important application of computed tomographic (CT) imaging systems, as well as magnetic resonance (MR) imaging and 3-D x-ray (XR) imaging systems, is to produce 3D image data sets for vascular analysis, which can include analysis of a variety of tortuous tubular structures such as airways, ducts, nerves, blood vessels, etc. Production of such 3D image data sets is particularly important for radiologists, who are called upon to provide thorough visual reports to allow assessments of stenosis or aneurysm parameters, quantify lengths, section sizes, angles, and related parameters. Such information is commonly utilized by physicians to allow for surgical planning. For productivity reasons, as well as to reduce film costs, the 3D image data sets should be limited to only a small set of significant images.

3D visualization software provides a set of tools to perform length, angle or volume measurements and to visualize a volume in different ways, for example, using cross-sections, navigator or volume rendering. Known methods for quantification and analysis of vessel pathologies require an extensive array of tools to localize possible lesions, and then to perform measurements. Such methods are highly operator dependent, and require both time and software expertise. For example, a trained operator may need more than one hour to complete a single abdominal aorta aneurysm case. Even with trained operators given all the required time, results are not particularly reproducible and there are no consistent reporting frameworks. Furthermore, some measurements, such as true 3D-length measurement along vessels, cannot be performed using known manual tools. Because of these limitations, only a small number of sites are able to provide high-quality reports.

Analyzing tortuous structures, such as airways, vessels, ducts or nerves is one of the major applications of medical imaging systems. This task is accomplished today by using multiple oblique slices to analyze local segments of these structures. These views provide a clear, undistorted picture of short sections from these objects but rarely encompass their full length. Curved reformation images provide synthetic views that capture the whole length of these tubular objects and are therefore well suited to this analysis task. True 3D length measurements along the axis can be obtained from these views and they are not too far from the real anatomy in many cases. Curved reformation images can be generated by sampling values along a curve at equidistant points to generate lines, and then translating this curve by a sampling vector to generate the next image line.

Despite the ability to generate curved reformation images, there does not currently exist an interactive method of displaying such curved reformation images and quantitative information at the same time. That is, although geometrical features such as bifurcations, local stenoses, calcifications and other features of a vessel can be displayed, there does not currently exist a manner of simultaneously displaying, in a meaningful manner, those geometrical features along with various quantitative information about the vessels. Such quantitative information of interest can include, for example, the shapes of particular vessel sections and their cross-sectional areas, minimum diameters, maximum diameters, and other characteristics of the vessels.

Therefore, it would be advantageous if new methods and apparatuses were developed that allowed medical imaging systems and related 3D visualization software to generate vessel images that simultaneously provided visual, geometric characteristics of the vessels along with quantitative information of interest. It would further be advantageous if the vessel images were easy to interpret so that persons viewing the images could easily associate the particular quantitative characteristics of the vessels with actual positions along the vessels. It additionally would be advantageous if such vessel images could be displayed in an interactive manner to allow operators to obtain desired information in a simple, efficient, consistent, repeatable, and rapid manner.

BRIEF SUMMARY OF THE INVENTION

The present invention is a method and apparatus for displaying tubular structures, and particularly a method and apparatus for displaying quantitative information about the tubular structures. According to the method, a polygon that approximates the centerline of the tubular structure of interest is defined by using automated methods that track this centerline or manually from user input. For each point of the centerline, a section of the structure of interest is defined in the plane orthogonal to the centerline, and for each section, information such as cross-sectional area, maximum diameter, and minimum diameter are calculated and stored in memory. For each point along the centerline, the cross-section that is normal to the centerline is found and aligned to a straight axis in order to obtain an unfolded image of the tubular structure. Then, along the side of the unfolded image of the tubular structure, a set of curves are displayed with the quantitative information previously stored. An index cursor is provided on the display. By moving this cursor, an operator can display the structure in other modes such as cross-section or navigator.

In particular, the present invention relates to a method of displaying information concerning a tubular structure. The method includes (a) determining a centerline along at least a portion of the tubular structure, and (b) determining a plurality of center points along the centerline, the center points being respectively separated from one another by a first sampling distance. The method further includes (c) determining a plurality of cross-sections at the plurality of center points, respectively, where each cross-section is perpendicular to the centerline at its respective center point, and (d) identifying first values associated with each of the cross-sections, where the first values are indicative of a first characteristic of the tubular structure at the respective cross-sections. The method additionally includes (e) generating a modified image of the tubular structure by computing a plurality of image lines of the modified image, where each image line corresponds to a respective cross-section, and (f) displaying a curve alongside the modified image, where the curve is representative of the first characteristic of the tubular structure, where the curve is formed by displaying a plurality of second values along a scale, where each second value is functionally related to a respective one of first values, and where each second value is positioned alongside the modified image of the tubular structure along a respective one of the image lines.

The present invention additionally relates to a method of displaying information concerning a tubular structure. The method includes (a) determining a centerline along at least a portion of the tubular structure, (b) determining a plurality of center points along the centerline, the center points being respectively separated from one another by a first sampling distance, and (c) determining a plurality of cross-sections centered on the plurality of center points, respectively, where each cross-section is perpendicular to the centerline at its respective center point. The method further includes (d) determining a plurality of segments within the plurality of cross-sections, respectively, and (e) determining a plurality of sets of segment points along the plurality of segments, respectively, where the segment points of each set are separated from one another by a second sampling distance. The method additionally includes (f) identifying first values at each of the cross-sections, where the first values are indicative of a first characteristic of the tubular structure at the respective cross-sections, and (g) generating a modified image of the tubular structure. The modified image is generated by determining a plurality of image lines of the modified image and a plurality of sets of image line points along the plurality of image lines, respectively, where each image line corresponds to a respective segment and each image line point corresponds to a respective segment point, and displaying at each image line point a color indicative of a second characteristic associated with its respective segment point. The method further includes (h) displaying a curve alongside the modified image, where the curve is representative of the first characteristic of the tubular structure, where the curve is formed by displaying a plurality of second values along a scale, where each second value is functionally related to a respective one of first values, and where each second value is positioned alongside the modified image of the tubular structure along a respective one of the image lines.

In particular, the present invention relates to a method of displaying information concerning a vessel. The method includes determining a centerline along at least a portion of the vessel, and determining a first pair of lines perpendicular to a pair of tangents of the centerline at a first pair of points along the centerline, respectively, where the first pair of points are spaced apart from one another along the centerline by a first distance. The method further includes identifying first characteristics associated with each of the first pair of lines, and generating an image of a modified vessel. The modified vessel has a straight axis with a second pair of points that are spaced apart from one another along the straight axis by a second distance. The modified vessel is generated to include second characteristics associated with a second pair of lines that are perpendicular to the straight axis at the second pair of points, respectively, where the second characteristics are related to the first characteristics.

The present invention further relates to an apparatus for displaying information concerning a vessel. The apparatus includes means for obtaining data concerning an actual vessel, and means for generating a modified vessel image based upon the obtained data, where the modified vessel image shows a straightened vessel having a first characteristic that is related to a second characteristic of the actual vessel as represented by the data. The apparatus further includes means for generating, alongside the modified vessel image, a graphical image showing variation of a parameter of the actual vessel as a function of position along the modified vessel image.

DETAILED DESCRIPTION OF THE INVENTION

Figure 1:
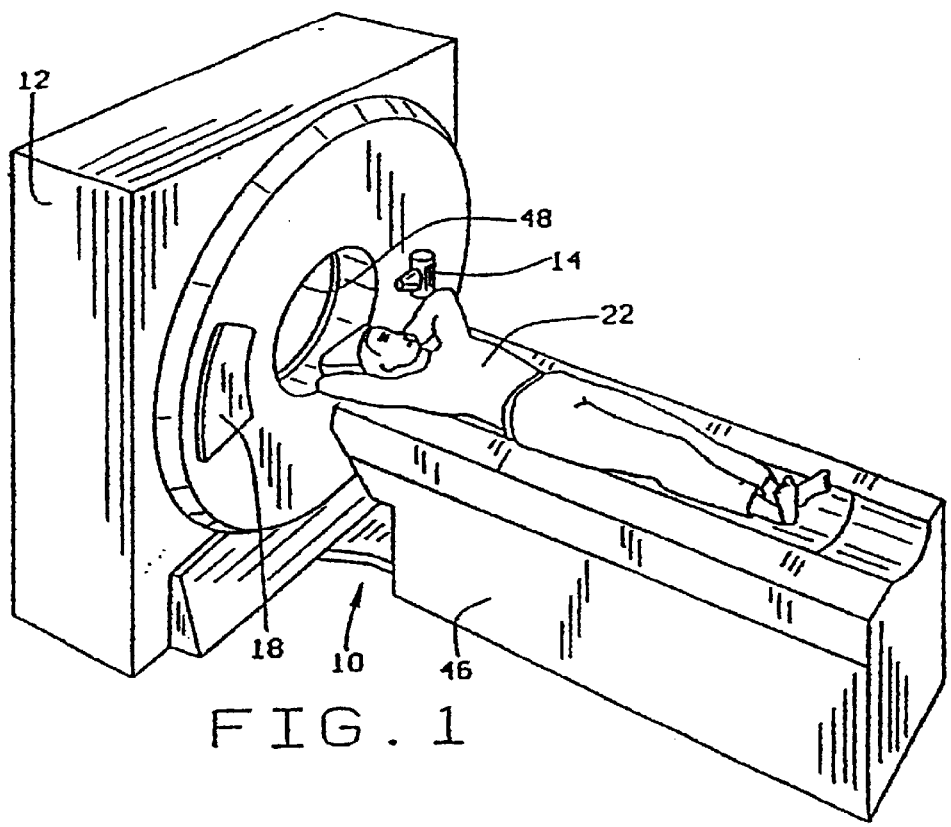
FIG. 1 is a pictorial view of a CT imaging system.
Figure 2:
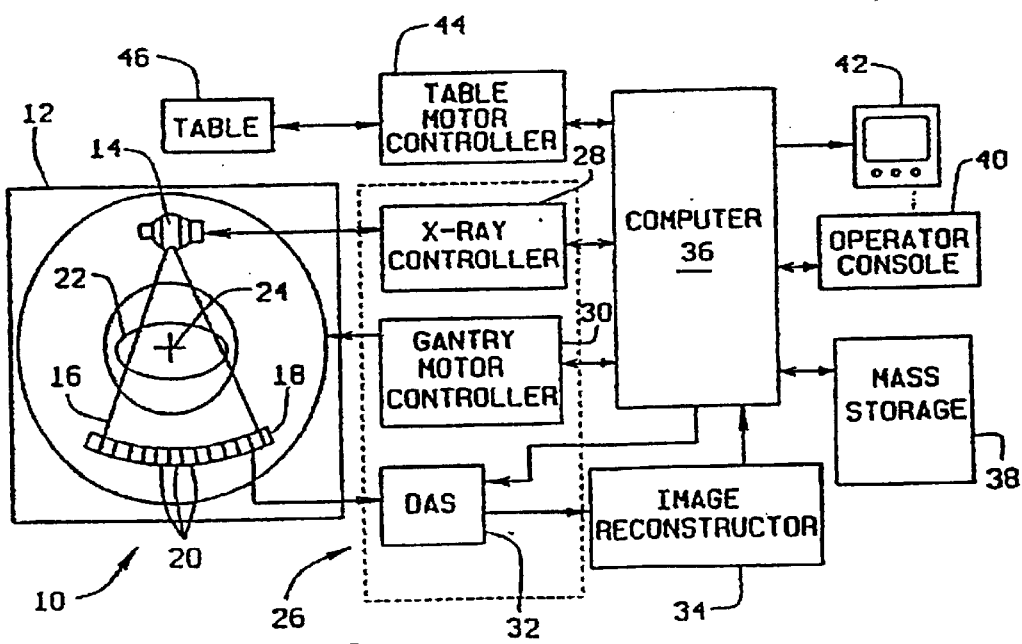
FIG. 2 is a block schematic diagram of the system illustrated in FIG. 1.

In one embodiment of the present invention, computed tomographic images are used. Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20, which together sense the projected x-rays that pass through an object, such as a medical patient 22. Each detector element 20 produces an electrical signal that represents the intensity of an impinging x-ray beam and hence the attenuation of the beam as it passes through object or patient 22. During a scan to acquire x-ray projection data, gantry 12 and the components mounted thereon rotate about a center of rotation 24. In one embodiment, and as shown in FIG. 2, detector elements 20 are arranged in one row so that projection data corresponding to a single image slice is acquired during a scan. In another embodiment, detector elements 20 are arranged in a plurality of parallel rows, so that projection data corresponding to a plurality of parallel slices can be acquired simultaneously during a scan.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38. Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figure 3:
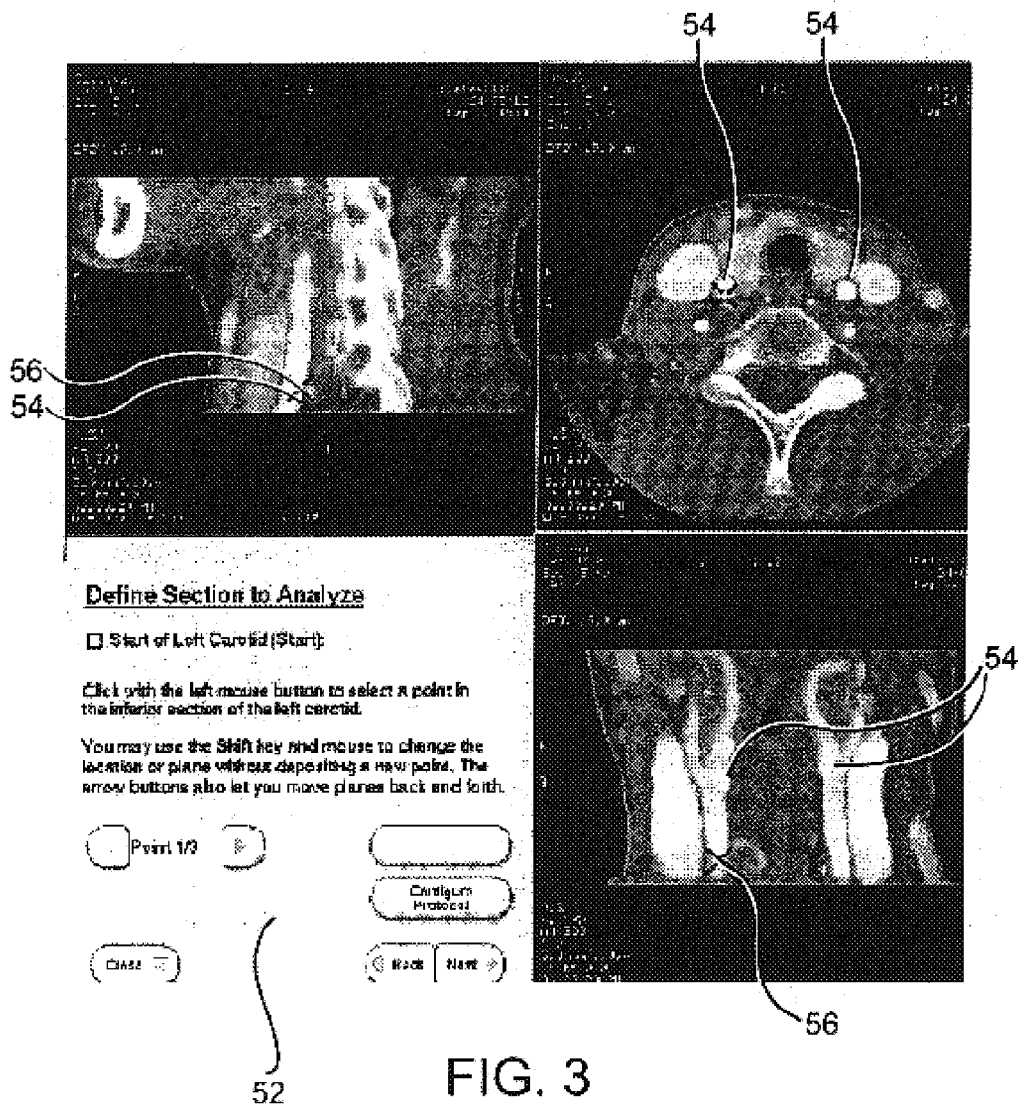
FIG. 3 is a drawing of a computer display of one embodiment of the present invention for the selection of vascular sections to be analyzed.

Computer 36, console 40, and display 42 are used in the following steps, in conjunction with a pointing device. The pointing device is, for example, a control on console 40 or a separate device such as a mouse (not shown). In one embodiment and referring to FIG. 3, software executed by computer 36 displays a wizard panel 52 that prompts a user to select locations in a tube-shaped tree, for example, a vascular tree 54, and the user is directed to point 56 to a section of tree 54. This section or region of interest may span across several branches, but the section should be connected. The user then clicks to select either a reformatted slice or a 3D view.

Figure 4:
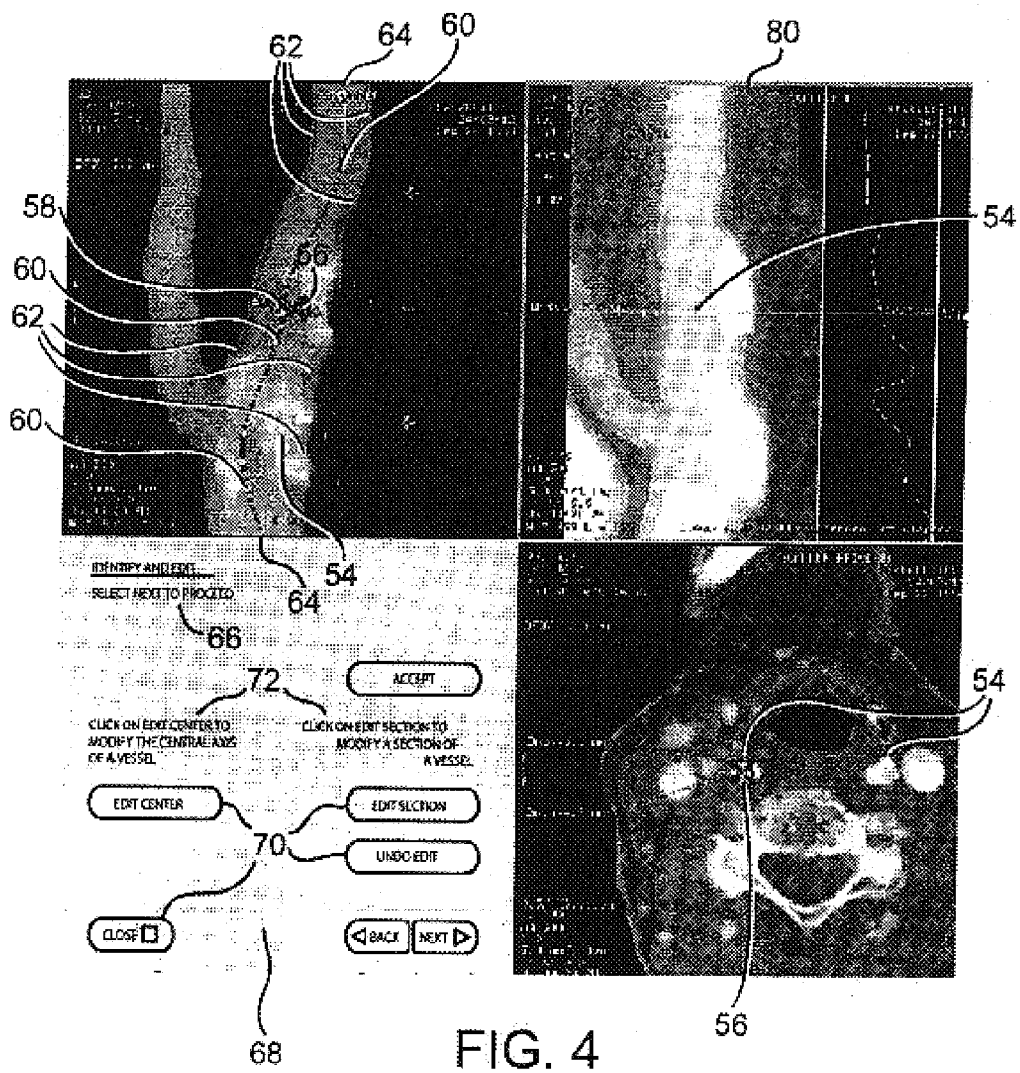
FIG. 4 is a drawing of a computer display showing automated computation of a centerline for vascular sections of interest.

Referring to FIG. 4, the software program then locates a center point 58 that is closest to a location 56 pointed to by the user. To compute the center point, a local axis 60 of a selected vessel is computed. In a plane perpendicular to axis 60, the software computes an "average" (i.e., a geometric center) of contour points 62 found around selected point 56. (Contour points 62 are boundary points of vessels 64 or other structures found by computer 36 using contrasts, thresholding, or any other suitable method.) The software then prompts 66 the user for the next point of interest. This process is repeated until the locations of a set of points 56 defined by a given type of anatomy have been indicated by the user. The set of points 56 forms a polygon that approximates the actual centerline. In one embodiment, although the software is programmed with a number of points 56 to be selected for various given types of anatomy, the software provides the user with the option to skip points 56 not relevant for his or her specific needs. In this manner, the user selects a series of points of interest along a centerline of branches that have been identified. Wizard panel 52, in one embodiment, also provides tools (not shown in FIG. 4) to customize the number and/or names of the sections to be designated to permit the software to be tailored to site preferences or anatomical situations.

Next, the software computes a centerline 60 for the vascular sections of interest from the set of points 56 defined during the previous step. A dynamic programming algorithm is used to compute an initial path (not shown) that minimizes a cost function, for example, one that avoids low gray-level values of the image. Next, the software determines planes perpendicular to this path, and on each plane, the software computes a new center point 58 from contour points 62. A similar process is described in U.S. Pat. No. 6,151,404, which is hereby incorporated by reference herein. Vessels 64 are unfolded 80 along centerline 60 defined by new center points 58, and along each branch, the software computes the section area and maximum and minimum diameters for the section. After computation, the software permits the user to edit centerline 60 and the section area for each branch if the results are not deemed correct. A wizard panel 68 provides tools 70 and guidance 72 to perform these actions.

Figure 5:
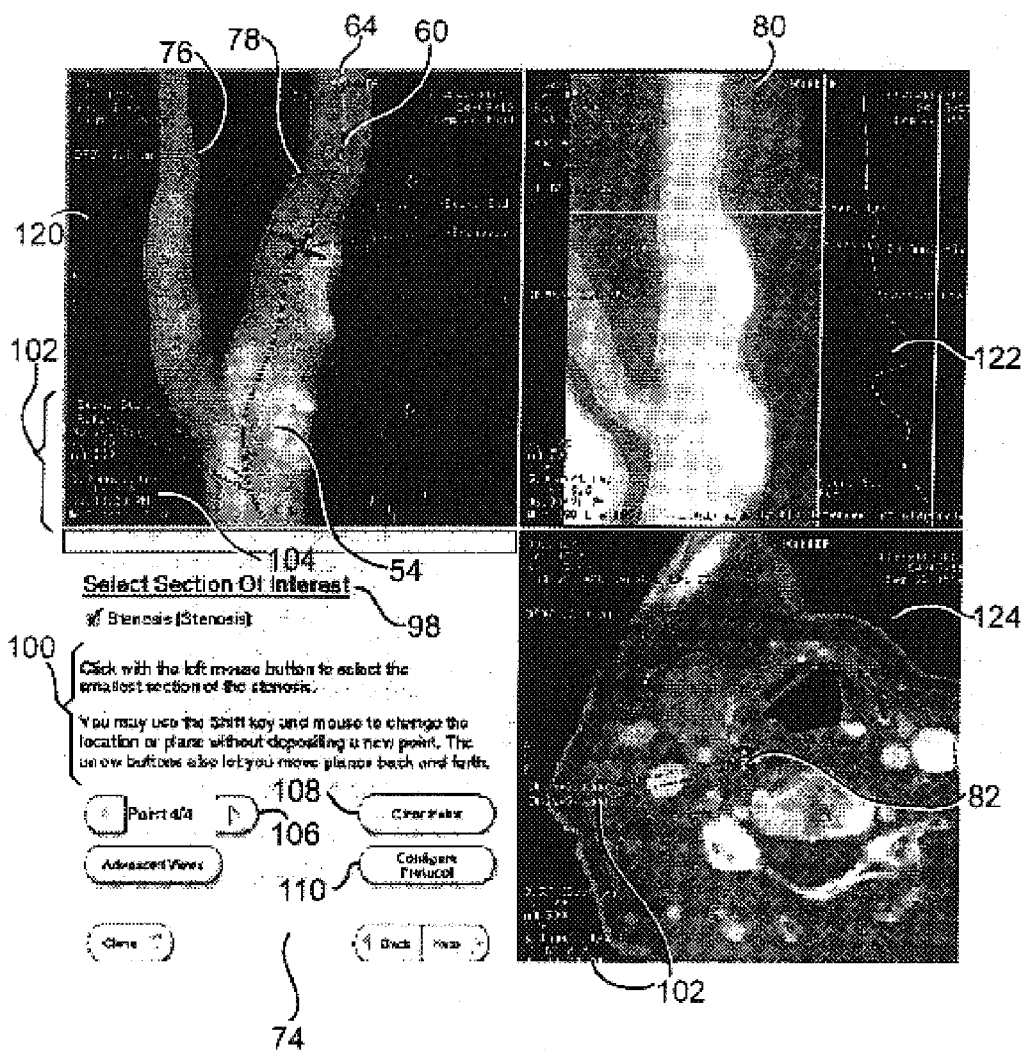
FIG. 5 is a drawing of a computer display for the selection of sections of interest for measurements and reports.

Referring to FIG. 5, one or more views 120, 122, 124 also can be displayed. In one embodiment, the view or views 120, 122 and 124 displayed is/are a curved view, as a function of the selected branch, reformatted views or 3D views generated as a function of the centerline that has been identified and a location along the centerline, and a selected branch (if there is more than one branch); or a reformatted views or 3D views generated as a function of the identified centerline, a location along the centerline and a selected geometric property of the cross-section boundary of the tube-shaped tree at selected location, as well as the selected branch (if there is more than one).

Also in one embodiment the view or views displayed is/are segmented 3D views, where the section of interest has been identified and a remainder of the patient's anatomy is not visible or attenuated; curved views, as a function of selected branch (if there is more than one); reformatted views or 3D views generated as a function of the centerline that has been identified and a location along the centerline, as well as the selected branch (if there is more than one); reformatted views or 3D views generated as a function of the identified centerline, a location along the centerline and a selected geometric property of the cross-section boundary of the tube-shaped tree at selected location, as well as the selected branch (if there is more than one).

Figure 6:
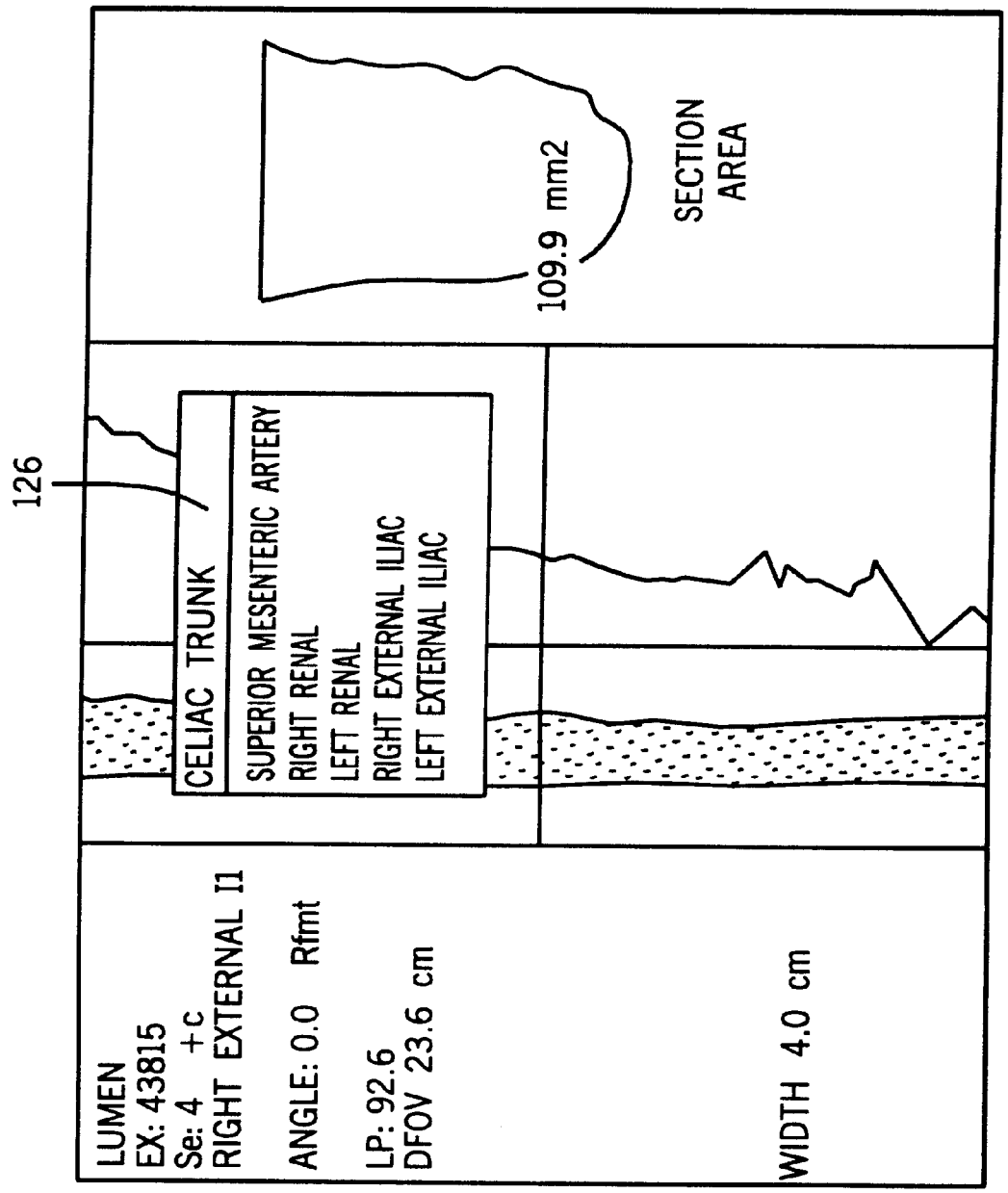
FIG. 6 is a drawing of a computer display showing a branch selection menu.

A user is also able to rotate the view around the unfolded selected branch 80 and, by moving the cursor mouse 82, obtain a cross section of a vessel at the cursor position on another view. Referring to FIG. 6, a menu 126 is available to assist the user in selecting any branch 76, 78 of vascular tree 54 of interest.

Figure 7:
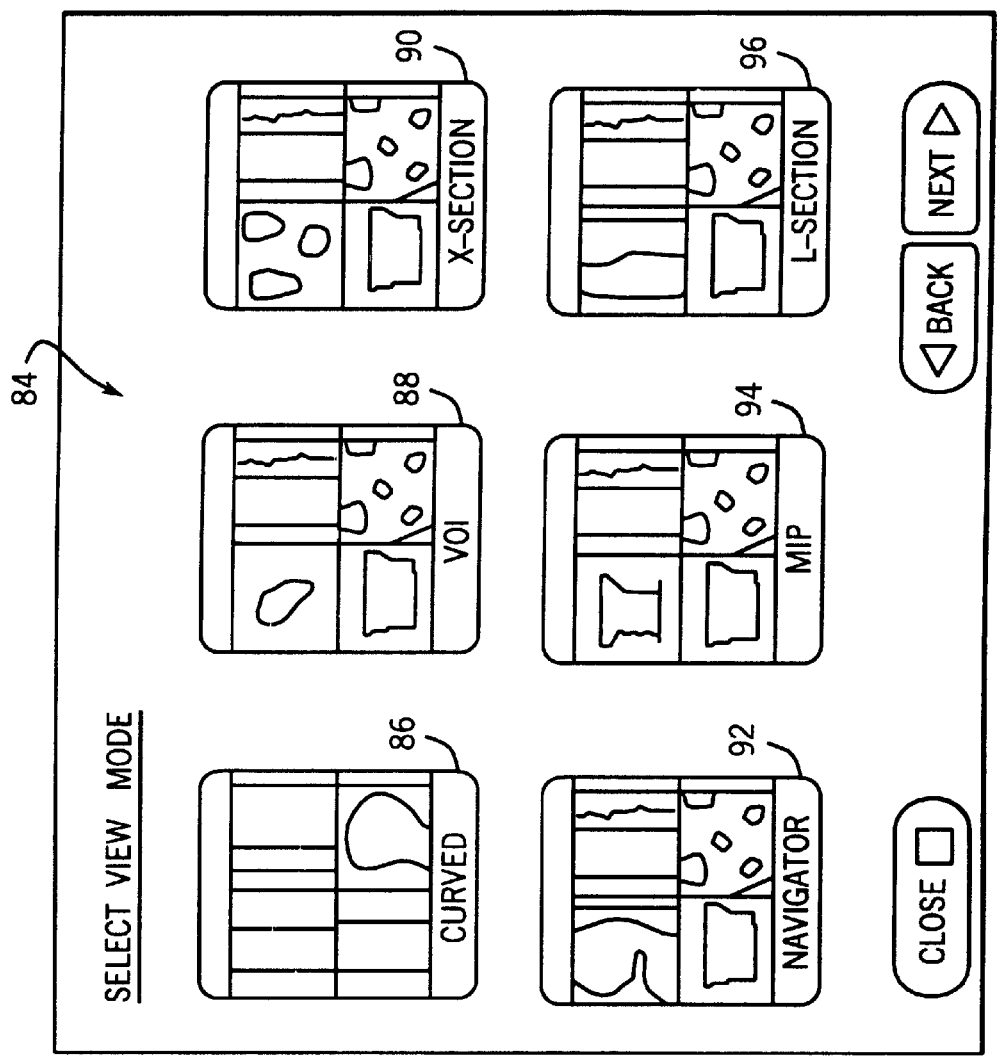
FIG. 7 is a drawing of a computer display showing a palette of advanced display tools.

In one embodiment and referring to FIG. 7, the software next provides a palette 84 of advanced display tools 86, 88, 90, 92, 94, and 96. In one embodiment, these include tools for curved views, with rotation controls; 3D views with automatic segmentation of the region of interest; endovascular 3D views; and automatic adjustment of reformatted slices to display cross-sections, longitudinal sections or specific views to capture the local smallest or largest vascular section.

Referring again to FIG. 5, the software prompts 98 the user to designate sections of interest for measurements and reports, for example, certain points where measurements are to be performed or where specific images are to be produced. In one embodiment, the software provides explicit directions 100 and pre-defined labels 102. Examples of such points of interests include a beginning and an ending of a stenosis or aneurysm section, specific locations that pertain to the placement of endo-vascular prostheses or reference-healthy-sections. Some of these points can be placed by the user, while others can be located automatically. One or more measurements 104 are attached to these points in order to compute section area or diameters, length, tortuosity or volume of a part of a vessel 64. Wizard panel 74 also provides tools 106, 108, 110 to customize the set of points as well as the measurements that should be performed. Measurements that are automatically made by the software are: automatic measurements of: 3D lengths along the centerline between two locations; computation of a volume of the vascular section between two of these locations; determination of a local cross-section area, maximum and minimum diameter, and/or average diameter at a selected point. These measurements are derived from the identification of the centerline and the contours.

Figure 8:
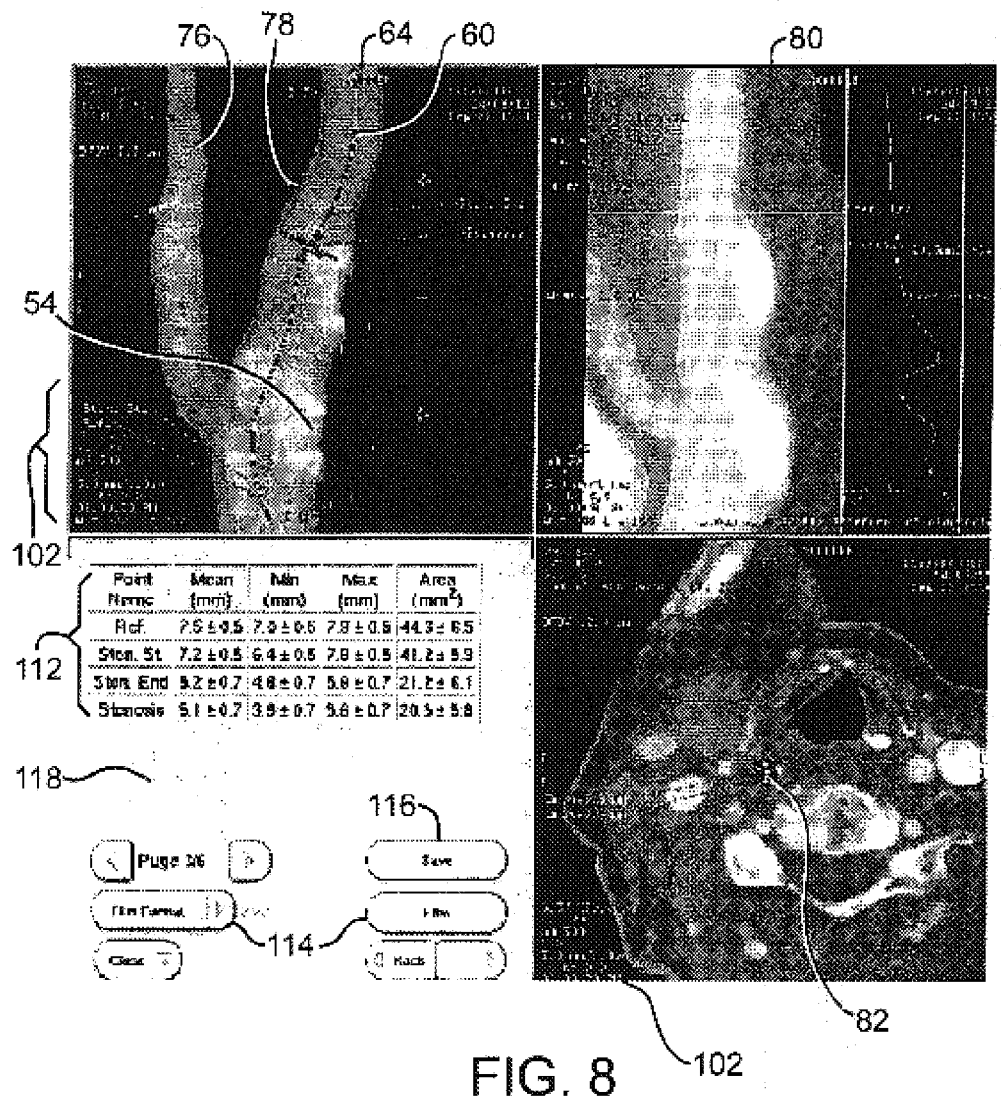
FIG. 8 is another drawing of a computer display for the selection of sections of interest for measurements and reports of one embodiment of the present invention, also showing a table of measurements.

In one embodiment and referring to FIG. 8, result tables 112 are provided to summarize measurements. In one embodiment, printing 114 and storing 116 capability is provided so that a user can either save or print the result tables with a set of significant vessel 64 images. Saving of measurements and selected images can be to a short- or long-term storage medium (including radiological film or paper hard copy) associated with computer 36. The software also provides a wizard panel 118 with tools and guidance to perform these actions. The user can select images to add to the report, if desired.

Figure 9:
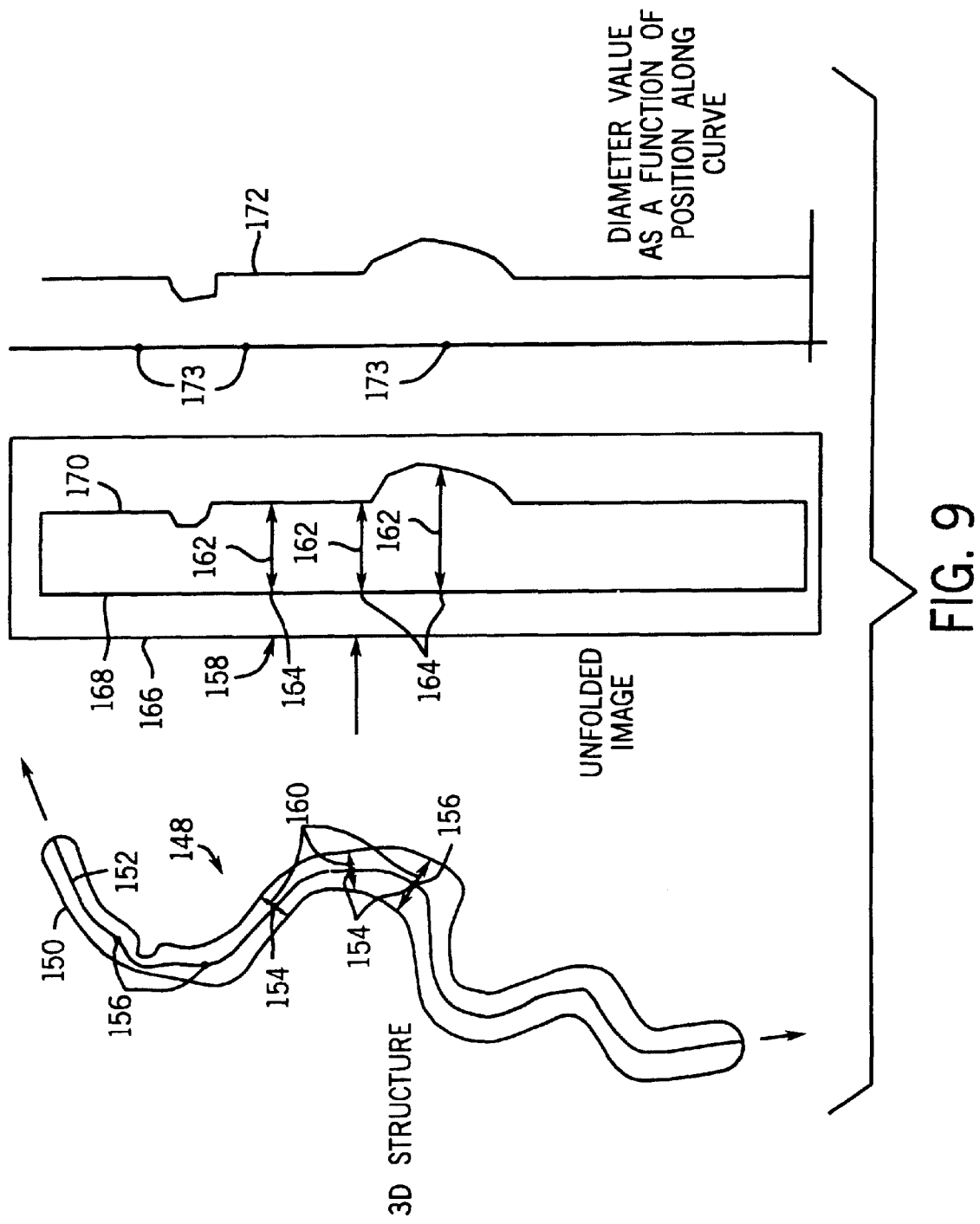
FIG. 9 is an exemplary schematic representation of a tubular structure that is unfolded and then displayed along with a curve indicating an exemplary physical characteristic of the tubular structure.

Referring particularly to FIGS. 9, 10, 11, 12 and 13, the present invention relates to another tool which is made available to a physician. Referring particularly to FIG. 9, a cross-sectional image 148 of a tubular structure such as a vessel 150 is shown. When the vessel 150 is selected for analysis as described above, a centerline 152 of the vessel is identified. The centerline 152 can be identified either automatically or manually, including identification by identifying the structure locally and then determining its axes of inertia, as discussed above. Typically, the centerline 152 is identified from a set of center points 154 that together form a polygon (which is formed by linearly connecting neighboring center points). In one embodiment, the center points 154 are respectively spaced apart from one another along the centerline 152 by a particular sampling distance.

Upon identification of the centerline 152, any of a number of different quantitative structural parameters of the vessel 150 are measured and/or calculated at cross-sections of the vessel associated with the points 156 along the centerline. The respective cross-section at each point 156 is defined as the cross-section of the vessel as taken within the plane that is normal to the centerline 152 at that point. The points 156 can, but need not be, the same points along the centerline 152 as the center points 154. In the particular example shown, only some of the center points 154 are the same as some of the points 156. The structural parameters that are measured/calculated at the cross-sections at points 156 can include, for example, cross-sectional area of the vessel 150, maximum, minimum or mean diameters of the vessel, distances, volumes, angles and other parameters.

Because the vessel 150 typically has at least some tortuosity, and often can have great tortuosity, an image that simply displays the vessel in its true geometric form (e.g., a cross-sectional view of its true geometric form) along with an indication of one or more of the measured/calculated structural parameters can be difficult to interpret. Thus, in accordance with an embodiment of the present invention, the vessel 150 is not displayed in its true geometric form as in the cross-sectional image 148, but rather is displayed in an unfolded format in an unfolded cross-sectional image 158. The cross-sectional image 148 of the actual geometric form of the vessel 150 is converted into an unfolded cross-sectional image 158 for display as follows.

First, lines (or line segments) 160 corresponding to the center points 154 along the centerline 152 are identified. The lines 160 are respectively determined along directions that are perpendicular to tangents at the respective center points 154. As such, the lines 160 fall within cross-sections of the vessel 150, where each cross-section is perpendicular to the centerline 152 at its respective center point 154. The particular orientation of the lines 160 within the respective cross-sections can be determined in a variety of ways. In one embodiment, the orientation of a first of the lines 160 is selected (in an arbitrary manner or otherwise), and then successive lines 160 are identified within successive cross-sections of successive center points by projecting the vector of the first line onto the plane of the successive cross-section, and successively performing this operation with respect to the successive planes. In an alternate embodiment, the lines 160 are all taken in directions parallel to a particular cross-sectional view of the vessel 150. Each of the lines 160 has a respective length corresponding to the width of the vessel 150 as determined by the points at which the respective line intersects the edges of the vessel. Depending upon the embodiment, the center points 154 at which the lines 160 are determined can be, but need not be, the same as the center points 154 or the points 156.

In accordance with the embodiment shown in FIG. 9, the unfolded cross-sectional image 158 of the vessel 150 is then generated by applying corresponding lines (or image lines) 162 to corresponding points 164 along a straight axis 166. In the embodiment shown, the points 164 are longitudinally spaced apart relative to one another along the straight axis 166 identically to the respective distances separating the corresponding points 154 along the centerline 152. In alternate embodiments, the relative spacings can be adjusted in a proportionate manner or in some other manner. Further, in the embodiment shown, the lengths of the lines 162 are not identical to those of the lines 160, although the lengths of the lines 162 are approximately equal to the corresponding lengths of the lines 160 when multiplied by a particular factor. In alternate embodiments, the lengths of the lines 162 can respectively be identical to those of the corresponding lines 160, or be related in some other fashion.

Further, in the exemplary unfolded cross-sectional image 158 shown, a first side 168 of the image is straight while a second side 170 is not, because the lines 162 are positioned next to the straight axis 166 such that differences in the lengths of the lines only influence the outline of the second side 170. In alternate embodiments, both the first and second sides 168, 170 could vary. For example, in one alternate embodiment, the straight axis 166 would be a centerline (not shown) of the unfolded cross-sectional image 158.

Figure 10:
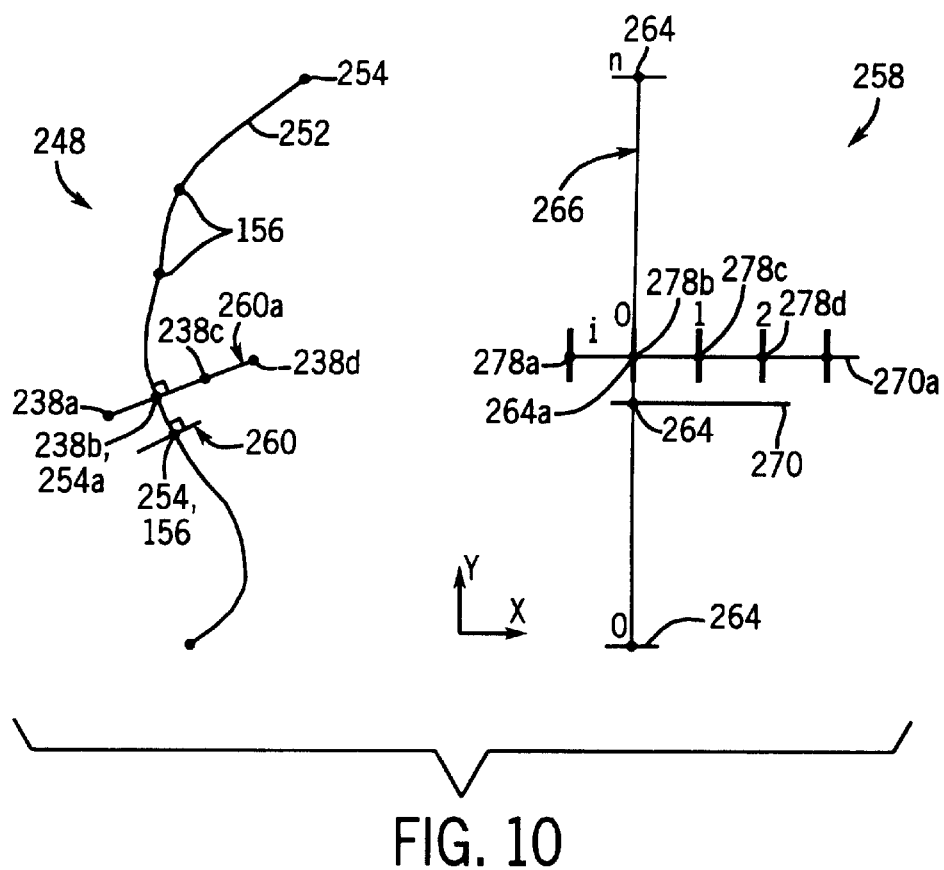
FIG. 10 is an exemplary schematic representation of an alternate manner of determining an unfolded representation of a tubular structure, instead of the manner of FIG. 9.
Figure 11:
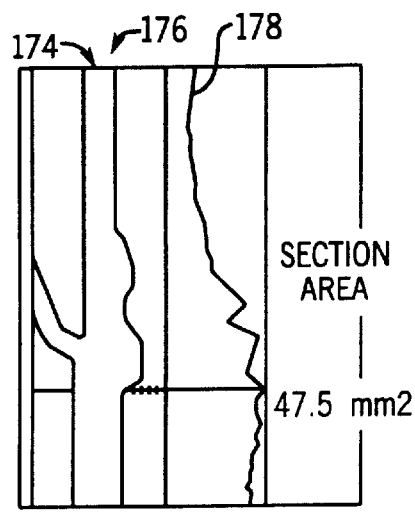
FIG. 11 is an exemplary pictorial representation of a displayed tubular structure with an associated curve indicating cross-sectional area.
Figure 12:
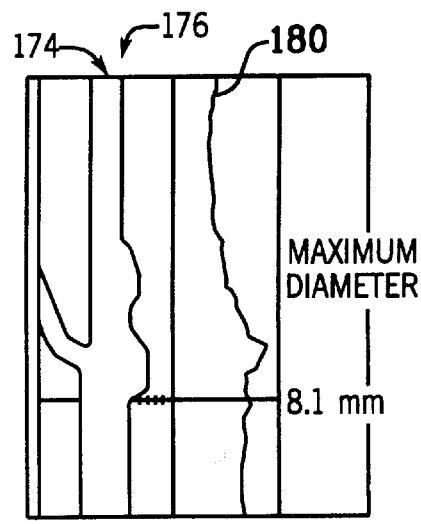
FIG. 12 is another exemplary pictorial representation of the same tubular structure as shown in FIG. 11 with an associated curve indicating maximum diameter.
Figure 13:
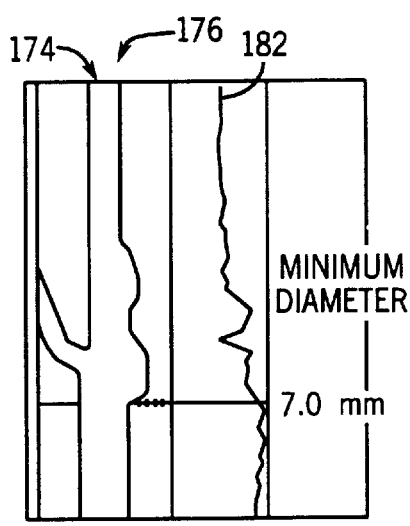
FIG. 13 is an additional exemplary pictorial representation of the same tubular structure as shown in FIGS. 11 and 12 with an associated curve indicating minimum diameter.

Turning to FIG. 10, another manner of generating an unfolded cross-sectional image 258 from a cross-sectional image 248 is shown schematically, in which the unfolded cross-sectional image that is generated is displayed in gray scale. As shown, in this embodiment, center points 254 are identified along a centerline 252 of the vessel shown in the cross-sectional image 248. These center points can be identical to or different than the points 156 (discussed above) at which quantitative structural parameters of interest of the vessel have been measured or calculated. Next, at the center points 254, lines 260 are identified that are perpendicular to respective tangents to the centerline 252 at the respective center points. Again, each of the lines 260 fall within cross-sections that are perpendicular to the centerline 252 at the respective center points 254, and the relative orientations of the lines within those cross-sections can be determined as discussed above with respect to FIG. 9. Then, along each of the lines 260, gray-level values are obtained at various points 238. The points 238 can include or overlap the center points 254, and in one embodiment are spaced apart from one another by a particular sampling distance. The gray-level values can be indicative of a variety of characteristics of the vessel or otherwise including, for example, thickness, heat, or the vessel tissue.

The gray level values are then used to generate the gray scale unfolded cross-sectional image 258. As in the embodiment of FIG. 9, points 264 corresponding to the center points 254 are spaced along a straight axis 266 that is representative of a straightened centerline. Then, lines 270 are identified perpendicular to the straight axis 266 at the respective points 264. The lines 270 thus correspond to the cross-sections associated with the center points 254, respectively, and further correspond to the lines 260 at the center points 254, respectively. Next, points 278 are identified along the lines 270 that correspond to the points 238 along the lines 260, and these points are given gray levels corresponding to the points 238. For example, for a given set of points 238a–d along a given line 260a through a particular center point 254a in the cross-sectional image 248, a corresponding set of points 278a–d are identified in the unfolded cross-sectional image 258. Each point 278a–d is spaced along a line 270a that is perpendicular to and intersects the straight axis 266 at the point 264a corresponding to the point 254a. Each of the points 278a–d is then assigned the gray level of its corresponding point 238a–d in the cross-sectional image 248, such that the overall gray scale unfolded cross-sectional image can be displayed.

In the same manner as various parameters can be scaled with respect to the conversion between the cross-sectional image 148 and the unfolded cross-sectional image 158 of FIG. 9, various parameters can also be scaled during the conversion between the images 248 and 258 of FIG. 10. For example, the relative distances between the points 264 of the unfolded cross-sectional image 258 can be proportionate to, rather than identical to, the distances between the corresponding points 254 of the cross-sectional image 248. Likewise, the relative distances between the points 278a–d along the line 270a in the unfolded cross-sectional image 258 can be proportionate to, rather than identical to, the distances between the points 238a–d. Additionally, the gray scale values associated with the various points 238 in the cross-sectional image 248 can be darkened or otherwise manipulated prior to their being associated with the corresponding points 278 of the unfolded cross-sectional image 258.

Referring again to FIG. 9, once the unfolded cross-sectional image 158 has been created, a meaningful display of how the one or more quantitative structural parameters of the vessel 150 vary with position along the vessel can be provided. As shown in FIG. 9, a graph of cross-sectional diameter 172 of the vessel 150 (in this case, taken in the plane of the cross-sectional image 148) is displayed alongside the unfolded cross-sectional image 158, providing a clear representation of how the vessel 150 varies in diameter along its length. The graph 172 is constructed based upon the quantitative structural parameters that are measured/calculated at points 156. Again, the actual displayed values can be identical to the values of the structural parameters that are measured/calculated, or can be related functionally to those values (e.g., proportionately related). In one embodiment, the graph 172 is constructed by interpolating between actual measured/calculated values of the structural parameters that are plotted at points 173 that correspond to points 156, although in alternate embodiments the graph is generated from the actual measured/calculated values using other techniques. To the extent that the points 164 along the straight axis 166 are spaced apart differently than the points 154 are spaced along the centerline 152, the relative spacing of the points 173 will also be spaced apart differently than the spacing of the points 156.

Although not shown in FIG. 10, a graph similar to the graph 172 can also be displayed alongside a gray scale unfolded cross-sectional image generated in the manner discussed above with respect to FIG. 10. Again, such a graph can be generated by plotting values of (or related to) the parameters at points 173 corresponding to the points 156.

In the example of FIG. 9, the structural parameter displayed (cross-sectional diameter) in the graph 172 is the widths of the vessel 150, which parameter is also the basis for generating the unfolded cross-sectional image 158. Consequently, the graph and the outline of the second side 170 are identical. However, as discussed, one or more other quantitative structural parameters can also or instead be displayed on the graph 172. In this regard, turning to FIGS. 11, 12 and 13, additional exemplary images are provided showing both an unfolded cross-sectional image 174 of a vessel 176 and exemplary graphs 178, 180, and 182 of cross-sectional area, maximum diameter, and minimum diameter of the vessel, respectively. The unfolded cross-sectional image 174 displayed in FIGS. 11, 12 and 13 was generated in the manner discussed with respect to FIG. 10.

In additional embodiments, other structural parameters can be measured and displayed, including diameters within other particular cross-sectional areas, angles concerning relative alignments of various features of the vessel, volumes, distances between various features, and other parameters. Further, in certain embodiments, a variety of interactive features are available. For example, in one embodiment, the user can select which calculated structural parameter is to be displayed from a menu. In other embodiments, multiple structural parameters can be displayed at once, the manner of display of the unfolded cross-sectional image 158 or 258 can be varied, or the particular information used to determine the unfolded image can be varied. Also, in alternate embodiments, the quantitative structural parameters need not be displayed in graphs as shown, but instead alternate methods of display can be employed (e.g., a color-coded graph).

It should be understood that the methods and apparatuses described above are only exemplary and do not limit the scope of the invention, and that various modifications could be made by those skilled in the art that would fall under the scope of the invention.

What is claimed is:

1. A method of displaying information concerning a tubular structure, the method comprising:
   (a) determining a centerline along at least a portion of the tubular structure;
   (b) determining a plurality of center points along the centerline, the center points being respectively separated from one another by a first sampling distance;
   (c) determining a plurality of cross-sections at the plurality of center points, respectively, wherein each cross-section is perpendicular to the centerline at its respective center point;
   (d) identifying first values associated with each of the cross-sections, wherein the first values are indicative of a first characteristic of the tubular structure at the respective cross-sections;
   (e) generating a modified image of the tubular structure by computing a plurality of image lines of the modified image, wherein each image line corresponds to a respective cross-section; and
   (f) displaying a curve alongside the modified image, wherein the curve is representative of the first characteristic of the tubular structure, wherein the curve is formed by displaying a plurality of second values along a scale, wherein each second value is functionally related to a respective one of first values, and wherein each second value is positioned alongside the modified image of the tubular structure along a respective one of the image lines.

2. The method of claim 1, wherein a plurality of segments are identified that correspond to the respective cross-sections, and wherein each image line includes a plurality of gray-level values identical to respective gray-level values obtained with respect to the respective segment within the respective cross-section.

3. The method of claim 2, wherein an orientation of a second of the segments within its respective cross-section is obtained by projecting a vector associated with a first of the segments onto a plane containing the respective cross-section of the second segment.

4. The method of claim 1, wherein the tubular vessel is at least one of a blood vessel and an air pathway.

5. A method of displaying information concerning a tubular structure, the method comprising:
   (a) determining a centerline along at least a portion of the tubular structure;
   (b) determining a plurality of center points along the centerline, the center points being respectively separated from one another by a first sampling distance;
   (c) determining a plurality of cross-sections at the plurality of center points, respectively, wherein each cross-section is perpendicular to the centerline at its respective center point;
   (d) determining a plurality of segments within the plurality of cross-sections, respectively;
   (e) determining a plurality of sets of segment points along the plurality of segments, respectively, wherein the segment points of each set are separated from one another by a second sampling distance;
   (f) identifying first values at each of the cross-sections, wherein the first values are indicative of a first characteristic of the tubular structure at the respective cross-sections;
   (g) generating a modified image of the tubular structure, wherein the modified image is generated by
   determining a plurality of image lines of the modified image and a plurality of sets of image line points along the plurality of image lines, respectively, wherein each image line corresponds to a respective segment and each image line point corresponds to a respective segment point, and
   displaying at each image line point a color indicative of a second characteristic associated with its respective segment point; and
   (h) displaying a curve alongside the modified image, wherein the curve is representative of the first characteristic of the tubular structure, wherein the curve is formed by displaying a plurality of second values along a scale, wherein each second value is functionally related to a respective one of first values, and wherein each second value is positioned alongside the modified image of the tubular structure along a respective one of the image lines.

6. The method of claim 5, wherein the first characteristic is selected from the group consisting of cross-sectional area, maximum diameter, minimum diameter, diameter as measured in a particular cross-sectional plane, angular measures relative to at least one feature of the vessel, distances relative to at least one feature of the vessel, and volume.

7. A method of displaying information concerning a vessel, the method comprising:
   determining a centerline along at least a portion of the vessel;
   determining a first pair of lines perpendicular to a pair of tangents of the centerline at a first pair of points along the centerline, respectively, wherein the first pair of points are spaced apart from one another along the centerline by a first distance;
   identifying first characteristics associated with each of the first pair of lines;
   generating an image of a modified vessel,
   wherein the modified vessel has a straight axis with a second pair of points that are spaced apart from one another along the straight axis by a second distance, and
   wherein, the modified vessel is generated to include second characteristics associated with a second pair of lines that are perpendicular to the straight axis at the second pair of points, respectively, wherein the second characteristics are related to the first characteristics.

8. The method of claim 7, wherein the first characteristics are a first plurality of gray scale values associated with a first set of secondary points along the first pair of lines, and wherein the second characteristics are a second plurality of gray scale values associated with a second set of secondary points along the second pair of lines, wherein each secondary point of the first set corresponds to a respective secondary point of the second set.

9. The method of claim 8, wherein the secondary points along one of the second pair of lines are spaced apart from one another in the same manner as the corresponding secondary points along the corresponding one of the first pair of lines, and wherein the gray scale values associated with the second set of secondary points are identical to the corresponding gray scale values associated with the first set of secondary points.

10. The method of claim 7, wherein the first characteristics are widths of the vessel at the first pair of lines, and wherein the second characteristics are widths of the modified vessel at the second pair of lines.

11. The method of claim 7, wherein the straight axis is at least one of a centerline of the modified vessel, a left side of the modified vessel, and a right side of the modified vessel.

12. The method of claim 7, further comprising:

determining values of a first structural parameter of the vessel at a third pair of points along the centerline, wherein the third pair of points are spaced apart from one another along the centerline by at least a third distance.

13. The method of claim 12, wherein at least one of:

the third pair of points are identical to the first pair of points;

the third pair of points are each different than both of the first pair of points; and one of the third pair of points is identical to one of the first pair of points.

14. The method of claim 12, wherein the first structural parameter is selected from the group consisting of cross-sectional area, maximum diameter, minimum diameter, diameter as measured in a particular cross-sectional plane, angular measures relative to at least one feature of the vessel, distances relative to at least one feature of the vessel, and volume.

15. The method of claim 12, further comprising displaying graphically alongside the modified vessel an indication of the first structural parameter.

16. The method of claim 15, wherein when the values of the first structural parameter are determined at the third pair of points, the displayed indication includes corresponding values of the first structural parameter at a fourth pair of points spaced apart from one another by a fourth distance, wherein the corresponding values are functionally related to the determined values.

17. The method of claim 16, wherein the displayed indication is determined at least in part by interpolating between the corresponding values of the first structural parameter at the fourth pair of points.

18. The method of claim 16, wherein the centerline is determined from a plurality of points, and wherein the plurality of points are at least one of automatically determined and manually determined, and wherein the graphically displaying includes display on at least one of a graph, a color-coded diagram and a bar graph.

19. The method of claim 12, further comprising determining values of a second structural parameter and a third structural parameter, receiving a command from an operator as to which of the first, second and third structural parameters should be displayed, and then displaying graphically alongside the modified vessel at least one indication of the specified parameters alongside the modified vessel.

20. An apparatus for displaying information concerning a vessel, the apparatus comprising:

means for obtaining data concerning an actual vessel;

means for generating a modified vessel image based upon the obtained data, wherein the modified vessel image shows a straightened vessel having a first characteristic that is related to a second characteristic of the actual vessel as represented by the data;

means for generating, alongside the modified vessel image, a graphical image showing variation of a parameter of the actual vessel as a function of position along the modified vessel image.

21. The apparatus of claim 20, further comprising a computer-readable storage medium that exists as part of at least one of a CT imaging system, a MR imaging system, a XR imaging system, and a computer terminal for post-processing.

* * * * *